United States Patent [19]
Fuzioka et al.

[11] 4,286,942
[45] Sep. 1, 1981

[54] APPARATUS FOR PRODUCING PNEUMATIC TIRES

[75] Inventors: Keizi Fuzioka, Kishiwada; Masami Shinomiya, Izumi-Ohtsu, both of Japan

[73] Assignee: The Ohtsu Tire & Rubber Co., Ltd., Osaka, Japan

[21] Appl. No.: 197,231

[22] Filed: Oct. 15, 1980

[30] Foreign Application Priority Data

Oct. 31, 1979 [JP] Japan .................................. 54-141696

[51] Int. Cl.³ .......................... B29H 3/08; B29H 5/06; B29F 1/00; B29H 5/18
[52] U.S. Cl. ................................ 425/577; 425/129 R; 425/542; 425/54
[58] Field of Search ................... 425/129 R, 35, 28 R, 425/51, 40, 577, 542, 589; 152/330

[56] References Cited

U.S. PATENT DOCUMENTS

| | | | |
|---|---|---|---|
| 3,123,122 | 3/1964 | Beckadolph | 152/330 |
| 3,457,594 | 7/1969 | Baudou | 425/35 |
| 3,837,986 | 9/1974 | Gorter et al. | 425/28 R X |
| 4,057,446 | 11/1977 | Goodfellow | 425/51 X |
| 4,059,375 | 11/1977 | Kock et al. | 425/589 |

FOREIGN PATENT DOCUMENTS

| | | | |
|---|---|---|---|
| 2742061 | 3/1978 | Fed. Rep. of Germany | 425/577 |
| 965269 | 7/1964 | United Kingdom | 425/40 |

*Primary Examiner*—J. Howard Flint, Jr.
*Attorney, Agent, or Firm*—Armstrong, Nikaido, Marmelstein & Kubovcik

[57] ABSTRACT

A cavity having the shape of the tire to be produced is defined by a mold comprising an upper element, a lower element and a core element which are fittable to and releasable from one another. The core mold element comprises three divided segments, i.e., a segment for forming the inner surface of the tire tread, and a pair of segments for forming the inner surfaces of the tire sidewalls including tire beads. The core mold element has two pairs of nipping portions for holding the opposite ends of tire cords placed on the tread inner surface forming segment. The nipping portions in each pair are movable toward or away from each other. The tire cords nipped at their opposite ends by the core mold element are held in place within the cavity by the cooperation of the upper and lower mold elements, and a molding material composed of rubber or an equivalently elastic material is filled into the cavity and cured.

7 Claims, 17 Drawing Figures

Fig 5.
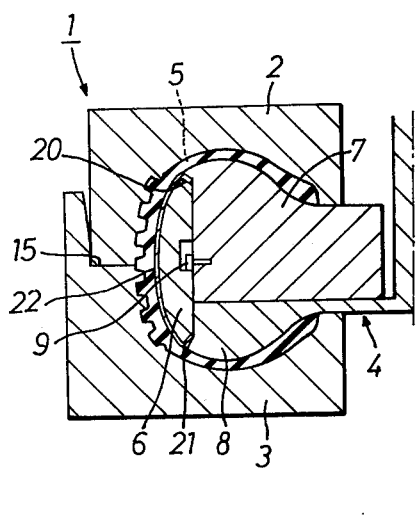
Fig 6.
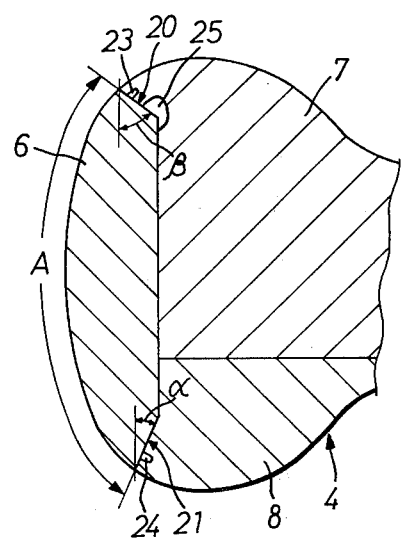
Fig 7. (1)
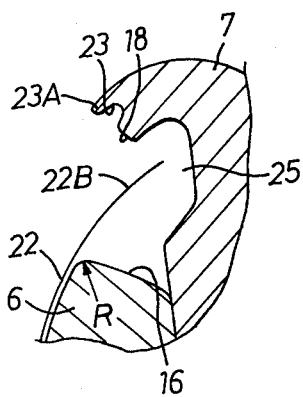
Fig 7. (2)
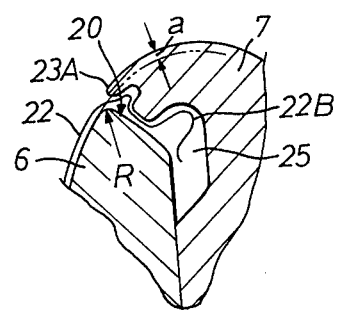

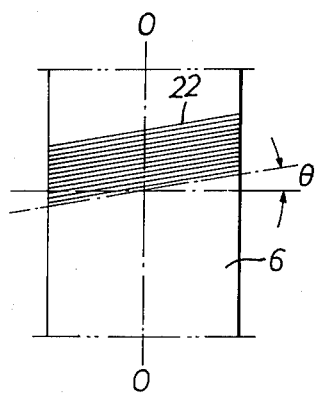
Fig 8.
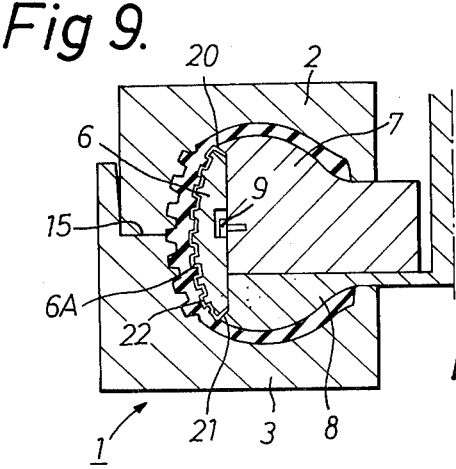
Fig 9.
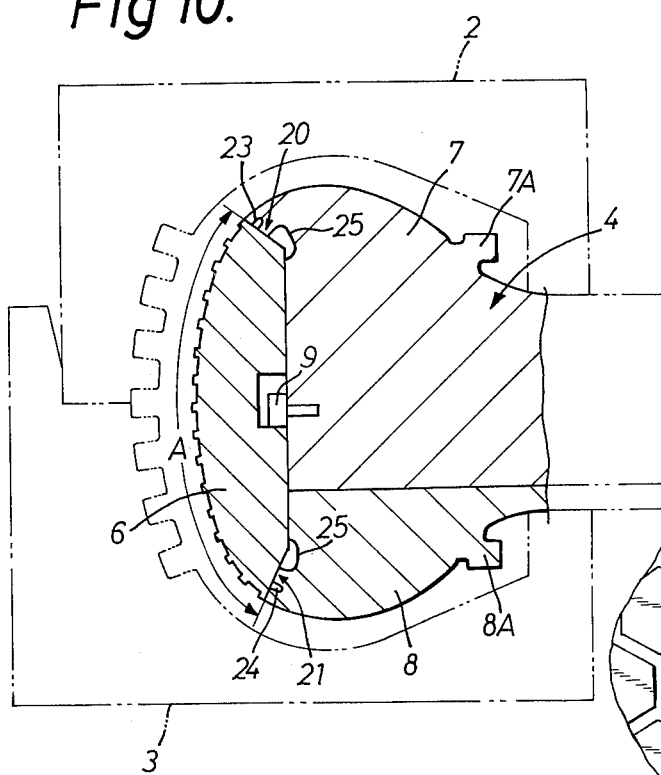
Fig 10.
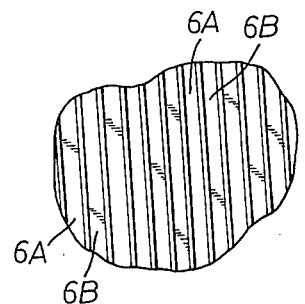
Fig 11. (1)
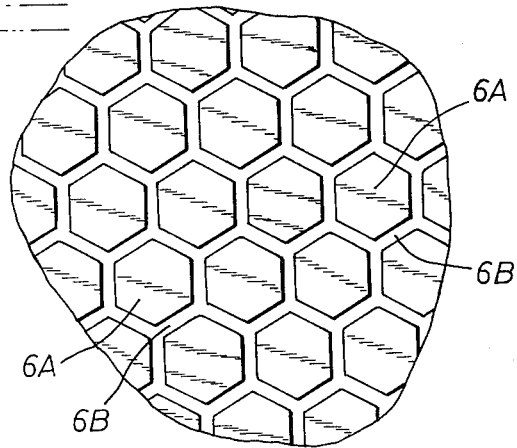
Fig 11. (2)

APPARATUS FOR PRODUCING PNEUMATIC TIRES

BACKGROUND OF THE INVENTION

Pneumatic tires for vehicles adapted to be driven in various areas including desert, wet land, waste land, etc. advantageously have high flexibility, a large ground contact area so as to have sufficient load-carrying capacity and traction for running in such areas and an inflation pressure of about 0.1 to 0.3 kg/cm$^2$ in order to run at a low ground contact pressure. Accordingly cordless tires made only of rubber or equivalently elastic material and capable of retaining a low pressure are preferable as pneumatic tires, especially as tubeless pneumatic tires, for such vehicles.

However, cordless tires are very susceptible to puncture when the tread strikes nails, glass pieces and other sharp obstacles on the road surface. Particularly tubeless pneumatic tires for vehicles to be driven in various areas are more prone to puncture because of varying driving environments.

While pneumatic tires are adapted to mitigate shocks by the deformation of the tread during travel, shock impact, when acting thereon, deforms the tire and also gives the tire an increased inflation pressure, which acts to reduce the deformation and the absorption of the impact.

The reduction in the volume of the deformed portion of the tire due to the deformation is balanced by bulging deformation of another portion of the sealed interior of the tire, or by an increase in the inflation pressure.

As means for rendering tires less susceptible to puncture, tire cords are incorporated in tubeless pneumatic tires which are made entirely of rubber or equivalently elastic material.

With such tubeless pneumatic tires having cords incorporated therein, the cords extend from one bead of the tire to the other bead, with the opposite ends of the cords substantially secured to the beads. The inflation pressure of the tire acts on the cords and is ultimately supported by the beads.

When the tire cords have a low elongation and extend from bead to bead as fixed thereto, the variation in the interior volume of the tire due to deformation is balanced to a greater extent by the increase of the inflation pressure of the tire than by the bulging deformation of the interior of the tire which is restrained by the cords. This greatly reduces the absorption of impact. Although outstanding in endurance against puncture, the tire does not have flexibility sufficient for use in vehicles for travelling in various areas, rendering such vehicles seriously uncomfortable to ride.

It has therefore been desired to provide tubeless pneumatic tires which have high cushioning ability, sufficient flexibility and outstanding resistance to puncture and which are especially suited for use in vehicles of the type described above. We have already succeeded in developing such tires which have the following improved construction.

The tubeless pneumatic tire of improved construction is made entirely of rubber or equivalently elastic material and has incorporated therein tire cords provided along the inner periphery of the tire and having opposite ends which are not fixedly attached to the beads. While the tire cords give the tread resistance to puncture, an elastic deformable portion composed substantially of rubber or equivalently elastic material is formed between the ends of the cords on each side of the tire and the corresponding bead. With this construction, the rise of inflation pressure is inhibited to a greater extend to afford improved cushioning ability and an extremely comfortable ride.

The tubeless pneumatic tire of such improved construction is produced by a mold comprising at least three components, namely an upper mold element, a lower mold element and a core mold element, defining a cavity having the shape of the tire. However, when rubber or like elastic material is charged into the cavity for molding, the flow of the material acts on the tire cords which are not secured at their ends to the bead portions, consequently disturbing the arrangement of the tire cords and causing movement of cords. Thus difficulties are encountered in accurately positioning the cord ends, with the inevitable result that the tire cords will not be arranged uniformly in the tire obtained.

Although the tire cords are usually placed on the core mold element in accurate position before the cavity is filled with the molding material, the cords, which are arranged in a toroidal annular form in conformity with the shape of the tire inner surface, are difficult to place in position. Additionally, if accurately positioned, the cords will be displaced by the flow of the molding material.

SUMMARY OF THE INVENTION

The present invention relates to an apparatus for producing pneumatic tires, and more particularly to an apparatus for producing pneumatic tires of improved construction with divided mold elements which tires are capable of retaining a relatively low inflation pressure, have incorporated therein tire cords arranged along the inner periphery of the tire tread, include a substantially elastic deformable portion between the ends of the cords and the bead on each side of the tire, are well-suited for use in vehicles adapted to be driven in various areas.

The invention provides an apparatus for producing pneumatic tires comprising at least three fittable mold components, i.e., an upper mold element, a lower mold element and a core mold element. The core mold element comprises at least three divided fittable mold segments for forming the inner surfaces of the tire tread and the tire sidewalls including a pair of beads. The tread inner surface forming mold segment and at least one of the sidewall inner surface forming mold segments have on their opposed faces nipping portions movable toward or away from each other for holding at least one end of each of tire cords.

An object of the present invention is to provide an apparatus of the above construction for producing pneumatic tires in which the nipping portions are adapted to hold at least one end of each cord placed on the outer peripheral surface of the core mold element so that the cords will not be disturbed by the flow of the molding material charged into the cavity, permitting the curing of the molding material with the cord ends accurately held in position.

Another object of the invention is to provide an apparatus of the construction described above for producing pneumatic tires in which the tread inner surface forming mold segment is formed on its outer peripheral surface with indentations and projections, with the nipping portions adapted to hold at least one end of each of the tire cords in position, so that the stretch of the cords due to the flow of the molding material can be accommodated by the indentations and projections when the cavity is filled with the molding material with the cords thus held in position.

Another object of the invention is to provide an apparatus of the type described above for producing pneumatic tires in which two pairs of nipping portions are disposed symmetrically with respect to the equatorial line of the tire for holding the opposite ends of the tire cords, the nipping portions in each pair being movable toward or away from each other, so that the tire cords can be arranged uniformly on the outer peripheral surface of the core mold element.

Another object of the invention is to provide an apparatus of the construction described in the third object above in which one of the nipping portions in each pair has an annular recess for accommodating therein the corresponding end of each of the tire cords in a curled form and substantially enclosing the curled end in a molded portion of the molding material, so that the opposite cord ends will be disposed in annular projections which are to be positioned near the shoulders of the tire and symmetrically with respect to the equatorial line and to be formed on the inner surface of the tire along a circumference centered about the axis of rotation of the tire.

Still another object of the invention is to provide an apparatus of the type described above for producing pneumatic tires in which the tire cords can be easily placed in position on the outer periphery of the core mold segment and by which annular grooves can be formed in the inner surface of the tire symmetrically in corresponding relation to the beads of the tire, the tire being easily releasable from the apparatus upon molding.

BRIEF DESCRIPTION OF THE DRAWINGS

FIGS. 1 to 5 are sectional views schematically showing a first embodiment of the invention and also illustrating tire molding steps;

FIGS. 1 to 3 are sectional views showing the movement of segments of a core mold element;

FIG. 4 is a sectional view showing an upper mold element, a lower mold element and the core mold element;

FIG. 5 is a sectional view showing the embodiment during molding operation;

FIG. 6 is a fragmentary enlarged view in section showing the core mold element of the first embodiment;

FIGS. 7 (1) and (2) are sectional views schematically showing tire cord end nipping portions;

FIG. 8 is a plan view schematically showing tire cords arranged in place;

FIG. 9 is a sectional view schematically showing a second embodiment of the invention during molding operation;

FIG. 10 is a fragmentary enlarged view in section showing the core mold element of the second embodiment;

FIGS. 11 (1) and (2) are fragmentary diagrams showing two examples of projections and indentations formed on the tread inner surface forming core mold segment of the second embodiment;

DESCRIPTION OF THE PREFERRED EMBODIMENTS

Figure 1:
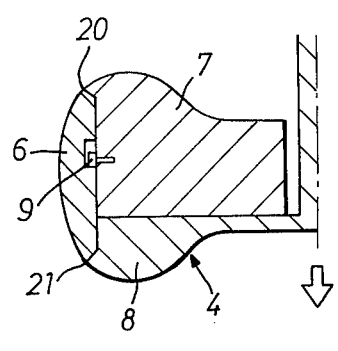

A first embodiment of the invention will be described with reference to FIGS. 1 to 5 which also schematically show the steps of producing tires.

A tire mold 1 comprises at least three fittable components, i.e., an upper mold element 2, a lower mold element 3 and a core mold element 4, which coact to define a cavity 5 having the shape of the tire to be manufactured. The cavity 5, which is shown in section in FIG. 5, extends continuously along the equatorial line of the tire in the form of a ring.

The core mold element 4 comprises at least three mold segments which are fittable together, i.e., a mold segment 6 for forming the inner surface of the tire tread, and a pair of mold segments 7 and 8 for forming the inner surfaces of tire sidewalls including the beads. When clamped, these divided segments are fitted together to form the inner surface of the tread, the inner surfaces of tire shoulder portions and the inner surfaces of the sidewalls including the beads.

The upper mold segment 7 and the lower mold segment 8 of the core mold element 4 are openably divided along a horizontal plane. The mold segment 6 for the tread is divided from the segments 7 and 8 along a vertical plane extending through the shoulders of the tire to be made. The segment 6 is fitted to the upper segment 7 by engaging means 9 and is vertically movable relative to the segment 7.

The lower segment 8 is movable upward and downward by the stroke of an unillustrated cylinder device disposed at the center of the molding apparatus. When the segments are clamped together, the whole core mold element 4 is movable upward and downward by the cylinder device relative to the upper mold element 2 which is stationary.

Furthermore, the lower mold element 3 is movable upward and downward relative to the stationary upper mold element 2 by the stroke of an unillustrated cylinder device. In this way, the upper, lower and core mold elements 2, 3, 4 can be clamped together for molding and released from one another for the removal of the molded tire.

Figure 4:
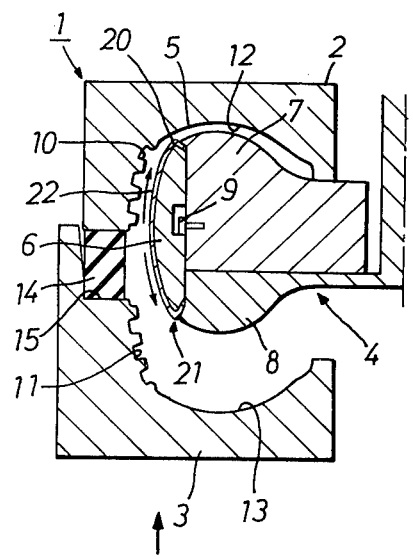

The upper and lower mold elements 2, 3 for defining the external shape and size of the tire are formed on their inner surfaces with portions 10, 11 for forming the tread pattern of the tire. These elements are also formed on their inner surfaces with portions 12, 13 for forming the outer surfaces of the tire sidewalls including the shoulders and beads. As seen in FIGS. 4 and 5, means 15 for feeding a block of molding material, namely rubber or an equivalently elastic material, extends circumferentially along the junction between the upper and lower mold elements 2, 3.

The core mold element 4 comprising at least three fittable segments has portions for nipping the ends of tire cords. According to the first embodiment shown in FIG. 3, the upper and lower end faces 16, 17 of the tread inner surface forming mold segment 6 are substantially opposed respectively to the end faces 18, 19 of the mold segments 7, 8 for forming the inner surfaces of the sidewalls. The end faces 16, 18 provide upper nipping portions 20 which are movable toward or away from each other. The end faces 17, 19 serve as lower nipping portions 21 which are similarly movable. The upper and lower nipping portions 20, 21 are positioned at the tire shoulders and extend centripetally of the tire.

As seen in FIG. 6, curved recesses 23, 24 extending circumferentially are formed at the upper and lower nipping portions 20, 21, that is, substantially in the end faces 18, 19 respectively.

Further as shown in FIGS. 6 and 7 (1) and (2), the upper nipping portions 20 have a curved recess 25 extending circumferentially and disposed at a location radially inward from the outer periphery of the core element 4. The recess 25 is adapted to accommodate the ends 22B of tire cords in a folded form as seen in FIG. 7 (2). The molding material, when partly flowing into the recess 25 and cured, encloses the folded cord ends 22B therein to protect the cords from breaking. Further as best seen in FIGS. 7 (1) and (2), the curved outer surface of the sidewall forming segment 7 is stepped inward from the tread forming segment 6 at the upper nipping portions 20 as indicated at a, whereby a bearing wall 23A is formed on the segment 7. When tire cords 22 are wound on the tread forming segment 6 with their ends 23B nipped in place and the molding material is charged into the cavity for molding, the flow of the material will stretch the cords 22, but the stretched portions of the cords bear against the wall 23A and are allowed to move radially into the core element 4 with ease.

Examples of useful materials for the tire cord 22 are those having a small elongation, such as nylon, polyester, rayon and other synthetic or artificial fibers, natural fibers, and steel, aluminum and like metals. Such materials may be used in combination. Such materials are used in the form of monofilaments, tapes, loosely arranged yarns or a thick fibric. These materials may be used as coated with an uncured or semicured material which is the same as the molding material or compatible therewith.

Figure 3:
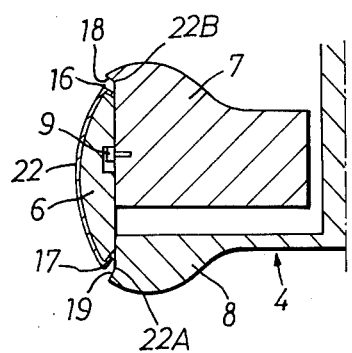

The tire cords 22 are applied to the outer periphery of the mold segment 6 with one end 22A of each cord first held between the lower nipping portions 21 as seen in FIG. 3, and the other ends 22B of the cords and thereafter held by the nipping portions 20. The cords 22 are wound on the segment 6 in the usual manner. When the weft elements of the tire cords 22 are placed at an angle $\theta$ of 0 to 15 degrees with respect to the equator O—O of the tire as seen in FIG. 8, the resulting tire will assure a comfortable ride. When the tire needs to have high rigidity and load-bearing capacity, the angle $\theta$ may be 50 degrees, for example.

Since the ends 22A of the cords 22 are first held between the lower nipping portions 21, and the remaining portions of the cords are then wound on the mold segment 6 transversely thereof as indicated at A in FIG. 6 over the entire circumference of the segment 6, the angle $\alpha$ of the lower nipping portions 21 is 10 to 45 degrees as shown in FIG. 6 to prevent the ends 22A from slipping off and to assure trouble-free application of the cords 22. The upper nipping portions 20 have an angle $\beta$ of 30 to 90 degrees to render the other ends 22B smoothly holdable by the portions 20.

The curved upper and lower corners of the mold segment 6 have a radius R of 3 to 8 mm as exemplified in FIGS. 7 (1) and (2) for the upper end face 16.

To prevent the doughnut-shaped cord arrangement from contraction and excessive expansion that would lead to the loosening and rupture of cords, the cords 22 have a length d which is smaller than the peripheral length D of the segment 6. Preferably $0.9 > d/D > 0.7$.

With reference chiefly to FIGS. 1 to 5, the operation of the first embodiment will be described below for the production of tubeless pneumatic tires.

Before tire cords 22 are wound on the core mold element 4, the mold segments 6 to 8 are in the fitted position as seen in FIG. 1.

Figure 2:
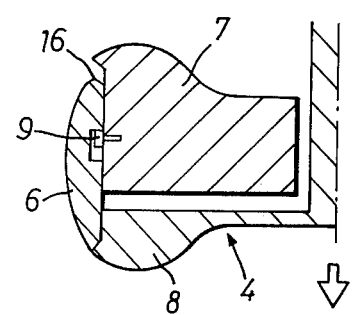

To wind tire cords 22 on the segment 6, the lower mold segment 8 is moved down by a stroke of an unillustrated cylinder device as seen in FIG. 2. Since the segment 6 is fitted to the lower segment 8 and also to the upper segment 7 by the engaging means 9, the segment 6 moves down with the lower segment 8 within the range allowed by the engaging means 9 to open the upper nipping portions 20 as seen in FIG. 2.

When the lower segment 8 is further lowered, the lower nipping portions 21 are opened as shown in FIG. 3 since the segment 6 is now held to the upper segment 7 by the engaging means 9.

With the upper and lower nipping portions 20, 21 thus opened, the ends 22A of tire cords 22 are placed between the lower nipping portions 21 manually or by a cord applicator of the known type (not shown). The lower segment 8 is then raised by the cylinder device to close the lower nipping portions 21. Thus the end faces 17, 19 coact to hold the ends 22A.

The remaining portions of the cords 22 are thereafter wound on the mold segment 6 over its outer periphery by the applicator or manually. With the other ends 22B released from the applicator and stretched as shown in FIG. 7 (1), both the lower segment 8 and the segment 6 are raised by the cylinder device to fit them to the upper element 7, whereby the end faces 16, 18 serving as the upper nipping portions 20 coact to hold the ends 22B.

In this way, the tire cords are wound on the tread inner surface forming mold segment 6 of the core element 4, with their opposite ends 22A, 22B fixedly held by the upper and lower nipping portions 20, 21. The clamping force applied at this time is preferably at least 1 kg per cord.

After the tire cords 22 have been held in place on the outer periphery of the core element 4, the element 4 is raised in its entirety by the cylinder device to proper position relative to the stationary upper mold element 2, and the lower mold element 3 is also raised by an unillustrated cylinder device. At this time, a molding material comprising rubber or an equivalently elastic material and in the form of an annular block 14 is placed on the feeding means 15 at the junction between the upper and lower mold elements 2 and 3. The annular block 14 has a volume sufficient to fill the cavity 5.

The lower mold element 3 is thus raised toward the upper mold element 2 as shown in FIG. 4 for clamping, whereby the annular block 14 is uniformly compressed in its entirety, with the result that the molding material flows into the cavity and then cured with the tire cords 22 held in place as seen in FIG. 5. For this operation, the leakage of the flowing material from the cavity 5 is prevented by the same means as conventionally used, while bead cores are placed in the bead portions. Alternatively, the core element may be provided with means for forming grooves for rigid rings as will be described in detail with reference to a second embodiment.

The pressure applied to the molding material to cause the same to flow would act on the tire cords 22 to displace or disturb the cords 22, but since the cords 22 are fixedly held at the opposite ends 22A, 22B by the upper and lower nipping portions 20, 21 in the illustrated embodiment, such displacement or disturbance is avoidable. The positions of the opposite ends 22A, 22B are determined by the upper and lower nipping portions 20, 21 which are disposed substantially symmetrically with respect to the equatorial line of the tire to be produced. For example, the pairs of nipping portions are located at the positions of the tire shoulders as illustrated, or at positions closer to or away from the equatorial line, whereby the tire is given the desired rigidity and flexibility.

Since the tire cords 22 have a substantially small elongation and are fixedly nipped at their opposite ends 22A, 22B, the cords can be placed accurately in position. However, when the stretch of the cords can not be absorbed in the range A shown in FIG. 6 due to the flow of the molding material, depending on the properties of the cords 22 or of the molding material, the ends 22B bear on the wall 23A as seen in FIG. 7 (2), and the stretched portions are accommodated in the curved recess 23. This permits the cords 22 to position accurately.

When the segment 7 is also provided with the curved recess 25 positioned radially inwardly from the recess 23, the cord ends 22B may be placed in a curled form in the recess 25 before molding and thereafter enclosed in a portion of the molding material. The rupture of cord or contact thereof with the tire inner surface can then be prevented.

FIGS. 9 to 11 show a second embodiment of the invention which include means for absorbing or accommodating the stretch of tire cords 22 more effectively.

The tread inner surface forming segment 6 shown in FIGS. 9 and 10 is formed on its outer peripheral surface with indentations 6A and projections 6B in a line pattern extending along the equatorial line of the tire as seen in FIG. 11 (1), or in a honeycomb pattern as shown in FIG. 11 (2).

According to the second embodiment, the tire cords 22, when subjected to the flow of molding material over the area A indicated, will flex or bend along projections and indentations, whereby the stretch of the cords 22 can be accommodated effectively without being displaced or disturbed.

As illustrated in FIG. 10, the curved recesses 23, 24, 25 already described may preferably be provided in combination with the indentations 6A and projections 6B, but the indentations and projections alone may be provided between the pairs of upper and lower nipping portions 20, 21 as means for accommodating the stretch of cords.

Figure 13:
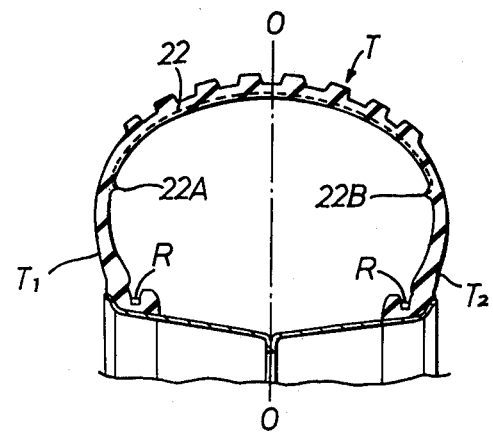
FIGS. 13, 14 and 15 are sectional views showing three tires as fitted to rims.
Figure 14:
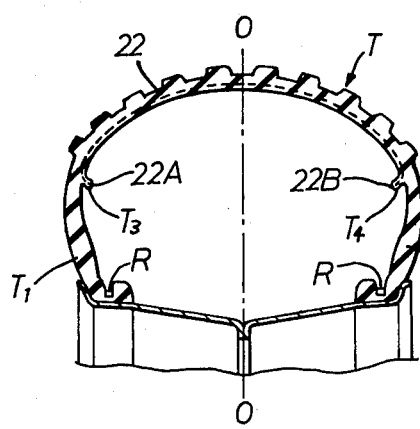
Figure 15:
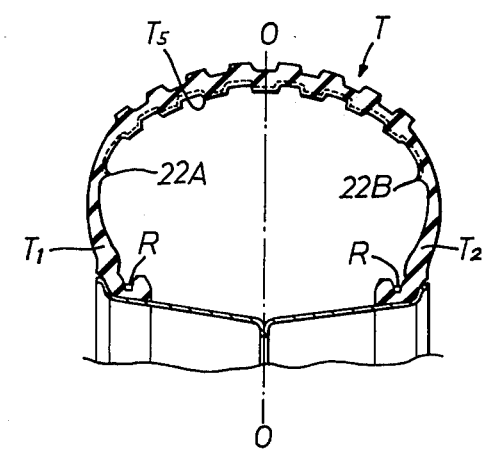

Further as best seen in FIG. 10, the mold segments 7, 8 of the second embodiment are provided, at the portions corresponding to the tire beads, with projections 7A, 8B for forming bead grooves. With the use of this embodiment, rigid rings R can be fitted in the grooves formed in the tire as seen in FIGS. 13 to 15.

FIG. 10 also shows that each pair of the nipping portions 20, 21 of the second embodiment has a curved recess 25 for preventing the rupture of cords.

With either of the first and second embodiments, tire cords 22 can be applied in at least two layers. Although the cores in the plurality of layers may preferably be fixedly held at their opposite ends in this case, the cords of the layers may be held by the lower nipping portions 21 each at its one end, and the other ends of the cords in the lowermost layer only may be held by the upper nipping portions 20, with the other cord ends in the other layers left as free ends. In this case, the stretch of the cords at the free ends due to the flow must be taken into consideration, so that the opposite ends of the cords should be positioned symmetrically with respect to the equatorial line of the tire.

Thus the tire cord can be held in place at least at one end. This is also true of the case in which the tire has a single layer of cords. Accordingly the embodiments may have at least one pair of nipping portions, i.e. the lower nipping portions 21.

Figure 12:
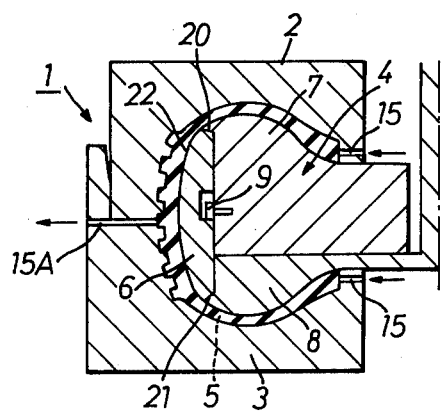
FIG. 12 is a sectional view schematically showing a third embodiment of the invention during molding operation.

FIG. 12 schematically shows a third embodiment of the invention, which differs from the foregoing embodiments in that a liquid molding material is used in place of an annular block of rubber or like elastic material. The embodiment has feeding means 15 in the form of a plurality of liquid inlet bores disposed close to the bead forming portions and arranged circumferentially. The outer mold has a liquid outlet bore 15A.

With the third embodiment, the core mold element with tire cords 22 wound thereon, and the upper and lower mold elements 2, 3 are clamped together to form a cavity 5, into which a liquid molding material is injected. The third embodiment has the same construction as the first embodiment with the exception of this feature, so that throughout several views of the drawings concerned, like parts are referred to by like reference numerals.

The second and third embodiments can be combined into another embodiment.

In the case of any of the foregoing embodiments, the tire molded is released from the mold in the same manner as in the prior art after the curing of the molding material.

FIG. 13 shows a tubeless tire T obtained by the apparatus of this invention and having rigid rings R fitted in the circumferential grooves in the bead portions. The opposite ends 22A, 22B of the tire cords 22 are positioned symmetrically with respect to the equatorial line 0—0 of the tire, substantially at its shoulders. The sidewalls of the tire include elastic deformable portions $T_1$, $T_2$. The tire has durability against puncture and assures a comfortable ride.

FIG. 14 shows a more preferred tire T having annular protrusions $T_3$, $T_4$ formed by the recesses 25 and having enclosed therein the opposite ends 22A, 22B of tire cords. FIG. 15 shows a tire having projections or indentations $T_5$ on the inner side of the tread and made by an apparatus according to the second embodiment of the invention shown in FIGS. 9 and 10.

The tubeless tires shown in FIGS. 13 to 15 may further incorporate a tube. Apparently tires so adapted can be produced by the same apparatus and method as described above.

According to the present invention described above, tubeless pneumatic tires can be produced which comprise a main body of rubber or equivalently elastic material and tire cords not connected to the beads, and which have resistance to puncture and suitable rigidity and assure a comfortable ride, with the tire cords positioned accurately in place free of displacement or disturbance. Thus the tires have various outstanding advantages for use.

What is claimed is:

1. An apparatus for producing pneumatic tires comprising at least three fittable mold components of an upper mold element, a lower mold element and a core mold element for defining a cavity having the shape of the tires, and means for feeding rubber or an equivalently elastic molding material to the cavity in an amount sufficient to fill the cavity, the core mold element comprising at least three divided fittable mold segments for forming the inner surfaces of the tire tread and tire sidewalls including a pair of beads, the tread inner surface forming mold segment and at least one of the sidewall inner surface forming mold segments having on their opposed faces nipping portions movable toward or away from each other for holding at least one end of each of tire cords.

2. An apparatus as defined in claim 1 wherein the tire cords can be provided along the tread inner surface forming mold segment of the core mold element, and two pairs of nipping portions are disposed symmetrically with respect to the equatorial line of the tire except where the beads are formed for holding the opposite ends of the tire cords, the nipping portions in each pair being movable toward or away from each other.

3. An apparatus as defined in claim 1 wherein the sidewall inner surface forming mold segments of the core mold element have bead forming portions each in the form of an annular projection and extending symmetrically with respect to the equatorial line of the tire therealong.

4. An apparatus as defined in claim 1 wherein the tread inner surface forming mold segment of the core mold element is provided on its outer peripheral surface with projections and indentations serving as means for accommodating the displacement and elongation of tire cords due to the flow of the molding material.

5. An apparatus as defined in claim 2 wherein the pairs of nipping portions are disposed at the portions of the core mold element corresponding to the shoulders of the tire and positioned symmetrically of the equatorial line of the tire, and one of the nipping portions in each pair has a curved annular recess for accommodating therein the corresponding end of each of the tire cords.

6. An apparatus as defined in claim 4 or 5 wherein means for accommodating the displacement and elongation of tire cords due to the flow of the molding material is formed as a cord end bearing wall on each of the sidewall inner surface forming mold segments opposed to the tread inner surface forming mold segment.

7. An apparatus as defined in claim 5 or 6 wherein one of the nipping portions in each pair is formed, centripetally inwardly from its outer periphery, with an annular projection for winding the corresponding end of each cord therearound and enclosing the end in a molded portion of the molding material.

* * * * *